United States Patent
Sherred

(10) Patent No.: US 12,466,499 B2
(45) Date of Patent: Nov. 11, 2025

(54) FIFTH WHEEL COVER ASSEMBLY

(71) Applicant: Ron Sherred, Pittsburgh, PA (US)

(72) Inventor: Ron Sherred, Pittsburgh, PA (US)

( * ) Notice: Subject to any disclaimer, the term of this patent is extended or adjusted under 35 U.S.C. 154(b) by 725 days.

(21) Appl. No.: 17/867,595

(22) Filed: Jul. 18, 2022

(65) Prior Publication Data

US 2024/0017774 A1    Jan. 18, 2024

(51) Int. Cl.
*B62D 53/08*    (2006.01)

(52) U.S. Cl.
CPC .................................. *B62D 53/0885* (2013.01)

(58) Field of Classification Search
CPC .................................................. B62D 53/0885
See application file for complete search history.

(56) References Cited

U.S. PATENT DOCUMENTS

| | | | |
|---|---|---|---|
| 4,169,635 A | 10/1979 | Szalay | |
| 5,058,914 A * | 10/1991 | Murcheson | B62D 53/0885 280/433 |
| 5,165,713 A * | 11/1992 | Picard | B62D 53/0885 280/433 |
| D365,799 S * | 1/1996 | Murcheson | D12/161 |
| 5,536,031 A | 7/1996 | Hurley | |
| 5,720,492 A * | 2/1998 | Wanzenried | B62D 53/08 280/433 |
| D450,276 S * | 11/2001 | Johnson | D12/161 |
| 7,703,791 B2 | 4/2010 | Varjassy | |
| D668,588 S * | 10/2012 | Eastman | D12/161 |
| 2013/0175787 A1 * | 7/2013 | L'Heureux | B60D 1/60 280/507 |

FOREIGN PATENT DOCUMENTS

WO    WO9301079    1/1993

* cited by examiner

*Primary Examiner* — Valentin Neacsu
*Assistant Examiner* — Marlon A Arce

(57) ABSTRACT

A fifth wheel cover assembly includes a fifth wheel that is mounted to a semi tractor. A cover is slidably positioned over the fifth wheel and the cover is structured to conform to the shape of the fifth wheel. A pair of springs is each of the springs is coupled between the cover and a connection point on the semi tractor to bias the cover into a covering position having the cover completely covering the fifth wheel. The cover is slidable into an exposing position having the cover being displaced from the fifth wheel. A brace is attached to the cover and the brace is strategically positioned such that the king pin of the trailer abuts the brace and urges the cover into the exposing positioned when the semi trailer is attached to the fifth wheel.

11 Claims, 8 Drawing Sheets

FIFTH WHEEL COVER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to fifth wheel devices and more particularly pertains to a new fifth wheel device for covering a fifth wheel on a semi tractor when a semi trailer is not attached to the fifth wheel. The device includes a fifth wheel and a cover slidably positioned on the fifth wheel. The device includes a pair of biasing members that are attached between the cover the fifth wheel to bias the cover into a covering position to cover the fifth wheel. The device includes a brace extending across the cover that is engaged by a king pin on a semi trailer to urge the cover into an exposing position to expose the fifth wheel and thereby facilitate the semi trailer to be attached to the fifth wheel.

(2) Description of Related Art Including Information Disclosed Under 37 CFR 1.97 and 1.98

The prior art relates to fifth wheel devices includes a fifth wheel cover that is structured to conform to the shape of a fifth wheel and which includes tabs that engage the fifth wheel. The prior art discloses a fifth wheel cover plate that is comprised of a friction reducing material. The prior art discloses a slip cover being positionable over a fifth wheel and which includes a drawstring. The prior art discloses an ornamental cover for a fifth wheel. The prior art discloses a rigid cover for a fifth wheel that includes clips for securing the cover. The prior art discloses a fifth wheel slip cover that includes an elastomeric band.

BRIEF SUMMARY OF THE INVENTION

An embodiment of the disclosure meets the needs presented above by generally comprising a fifth wheel that is mounted to a semi tractor. A cover is slidably positioned over the fifth wheel and the cover is structured to conform to the shape of the fifth wheel. A pair of springs is each of the springs is coupled between the cover and a connection point on the semi tractor to bias the cover into a covering position having the cover completely covering the fifth wheel. The cover is slidable into an exposing position having the cover being displaced from the fifth wheel. A brace is attached to the cover and the brace is strategically positioned such that the king pin of the trailer abuts the brace and urges the cover into the exposing positioned when the semi trailer is attached to the fifth wheel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
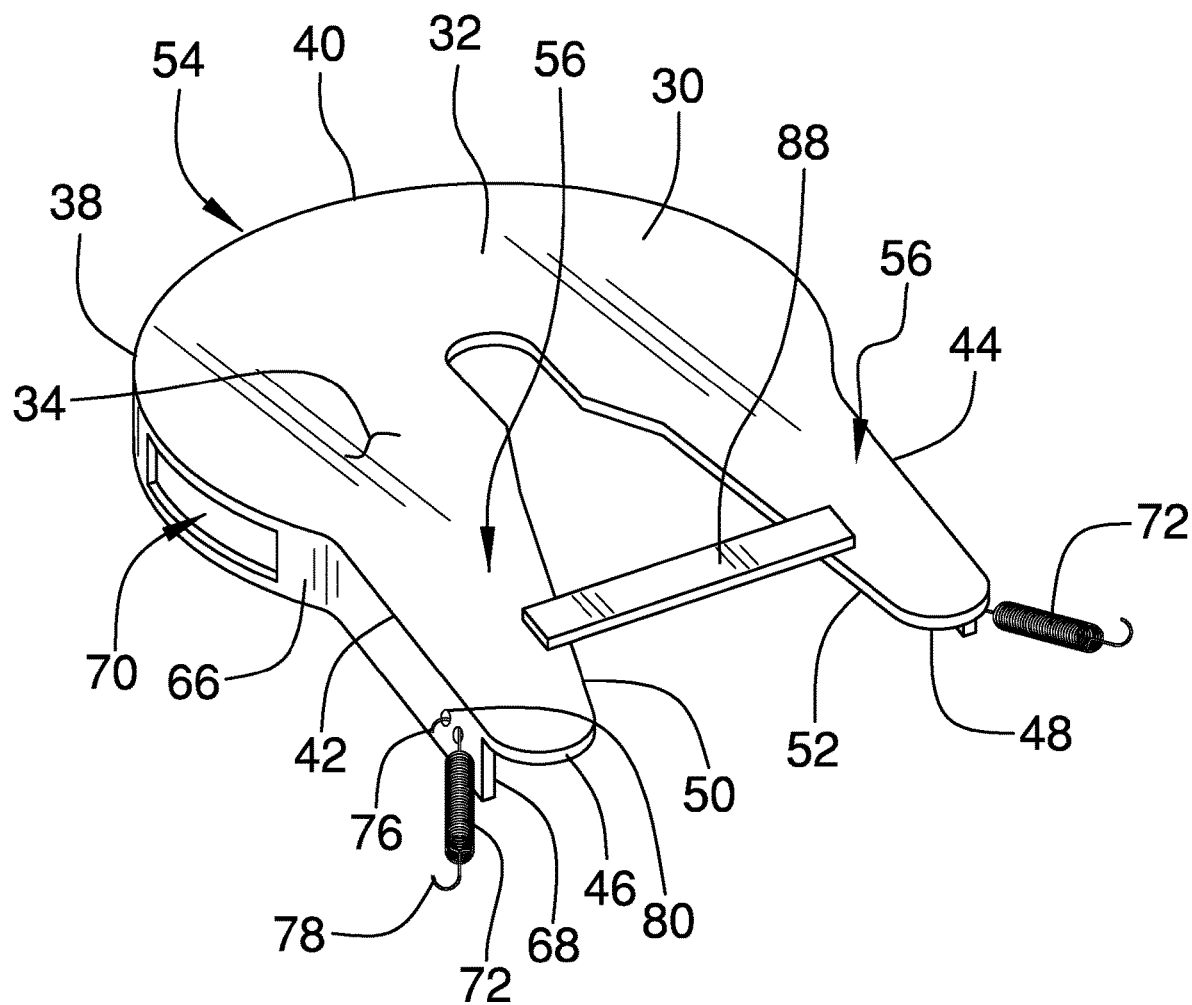
FIG. 1 is a top perspective view of a cover of an embodiment of the disclosure.
Figure 2:
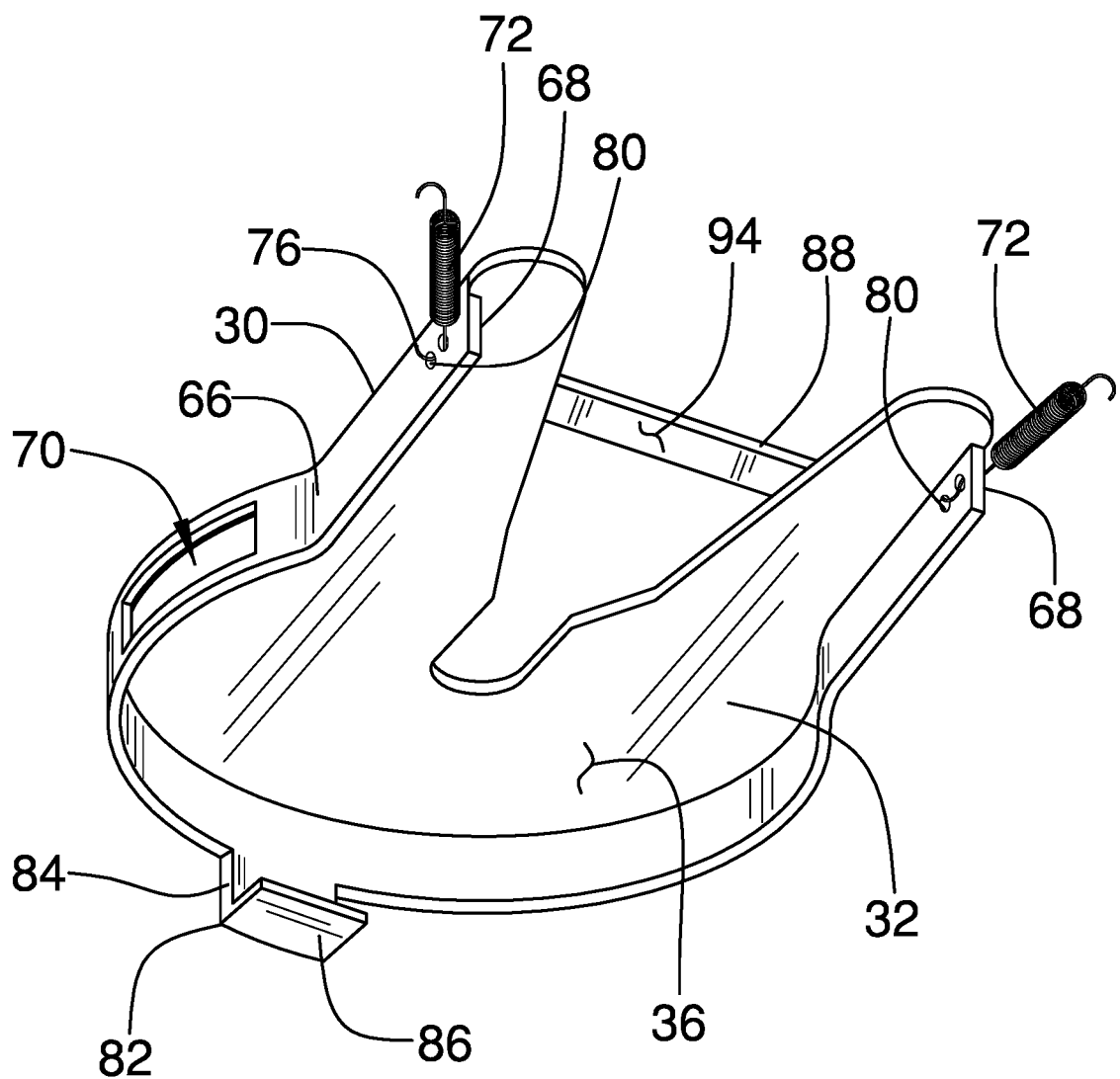
FIG. 2 is a bottom perspective view of a cover of an embodiment of the disclosure.
Figure 3:
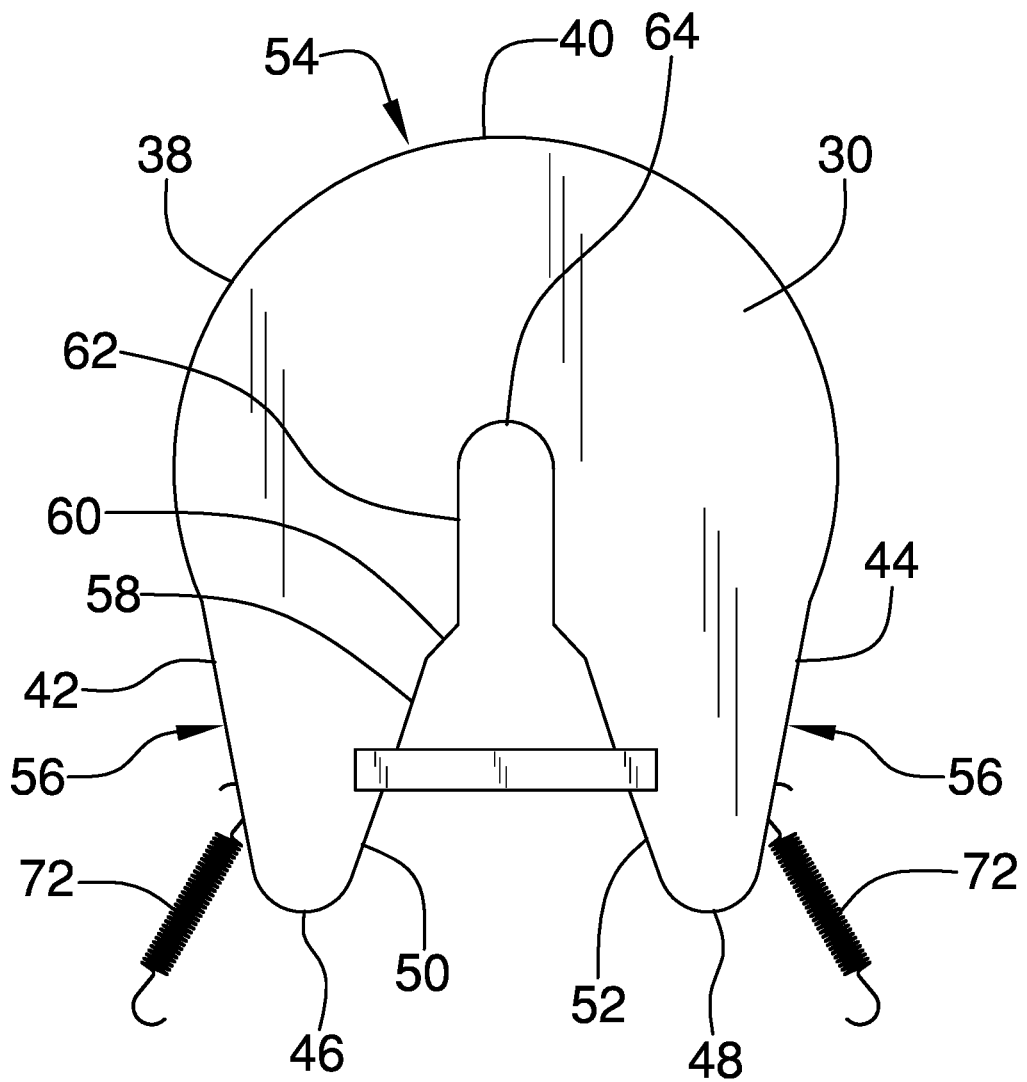
FIG. 3 is a top view of a cover of an embodiment of the disclosure.
Figure 4:
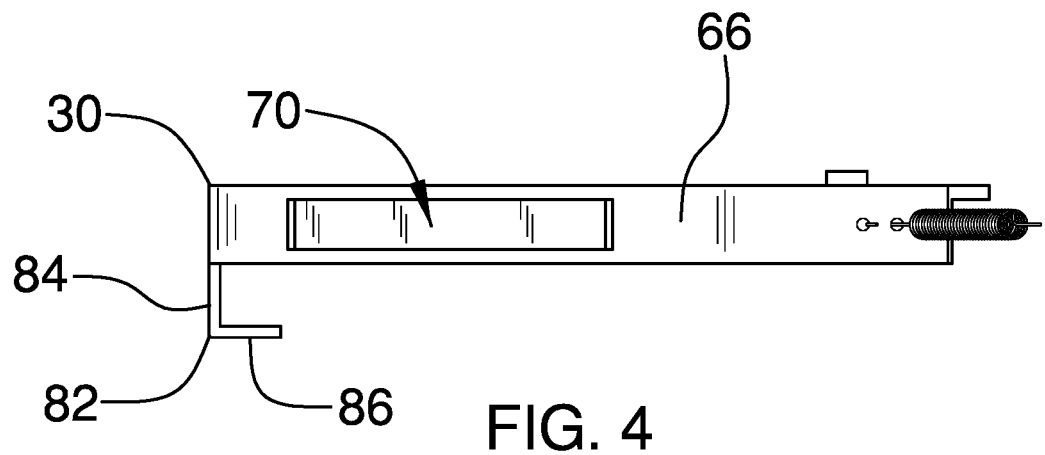
FIG. 4 is a left side view of a cover of an embodiment of the disclosure.
Figure 5:
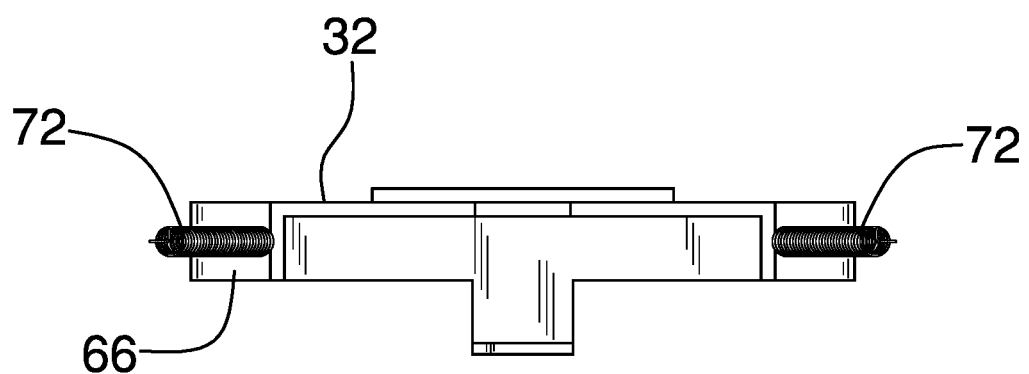
FIG. 5 is a front view of a cover of an embodiment of the disclosure.
Figure 6:
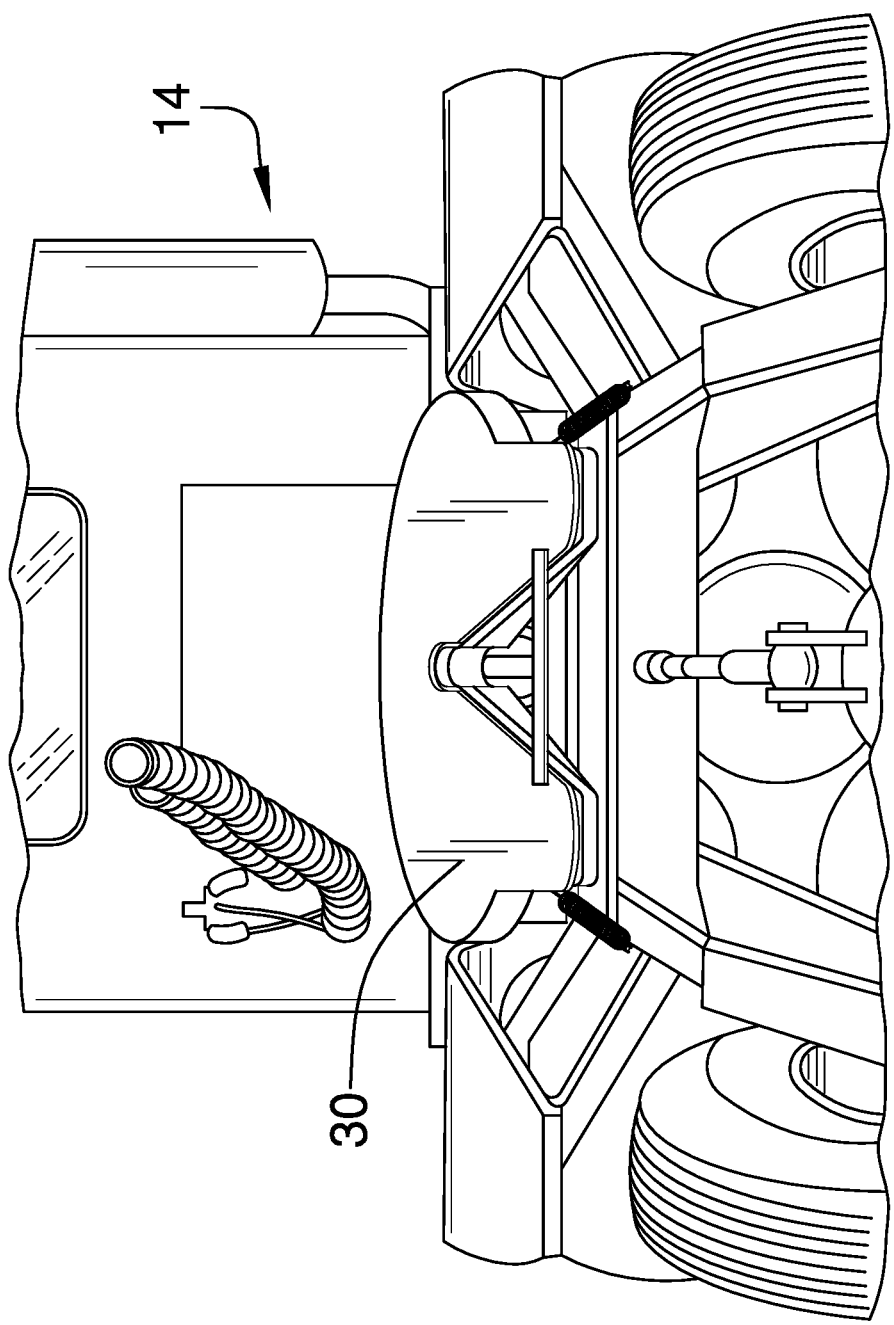
FIG. 6 is a perspective in-use view of an embodiment of the disclosure.
Figure 7:
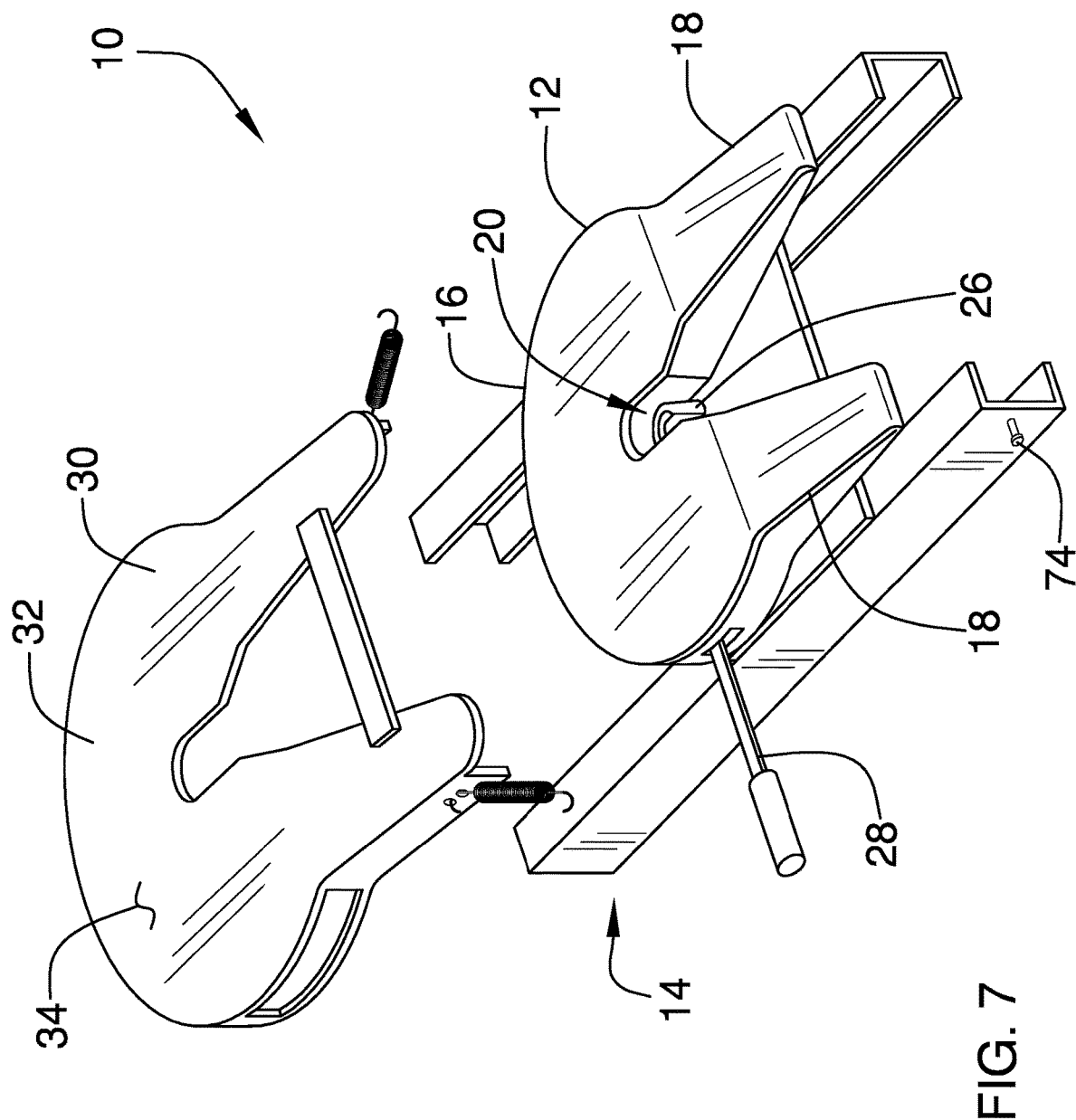
FIG. 7 is an exploded perspective view of a fifth wheel cover assembly according to an embodiment of the disclosure.
Figure 8:
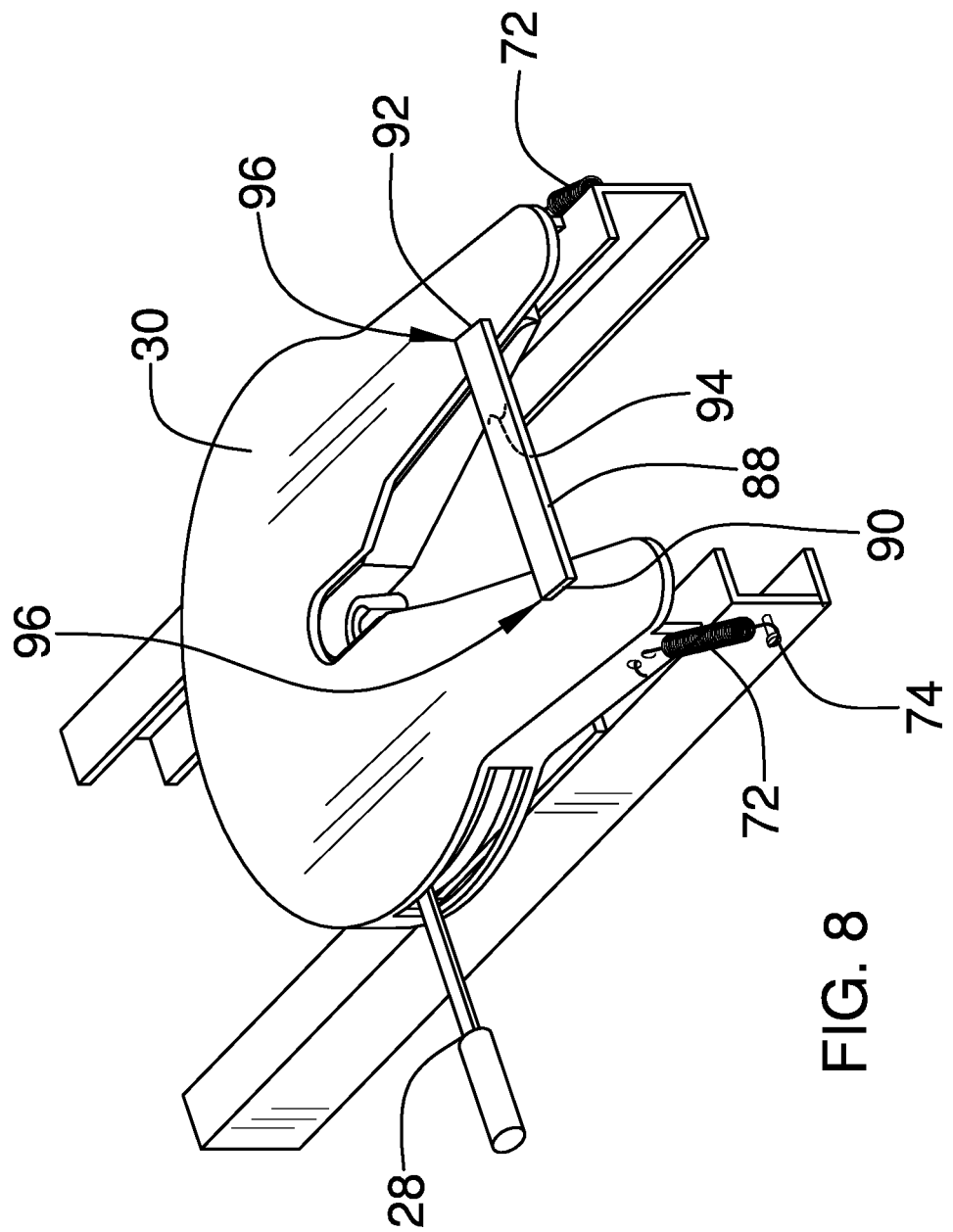
FIG. 8 is a top perspective view of an embodiment of the disclosure showing a cover in a covering position.
Figure 9:
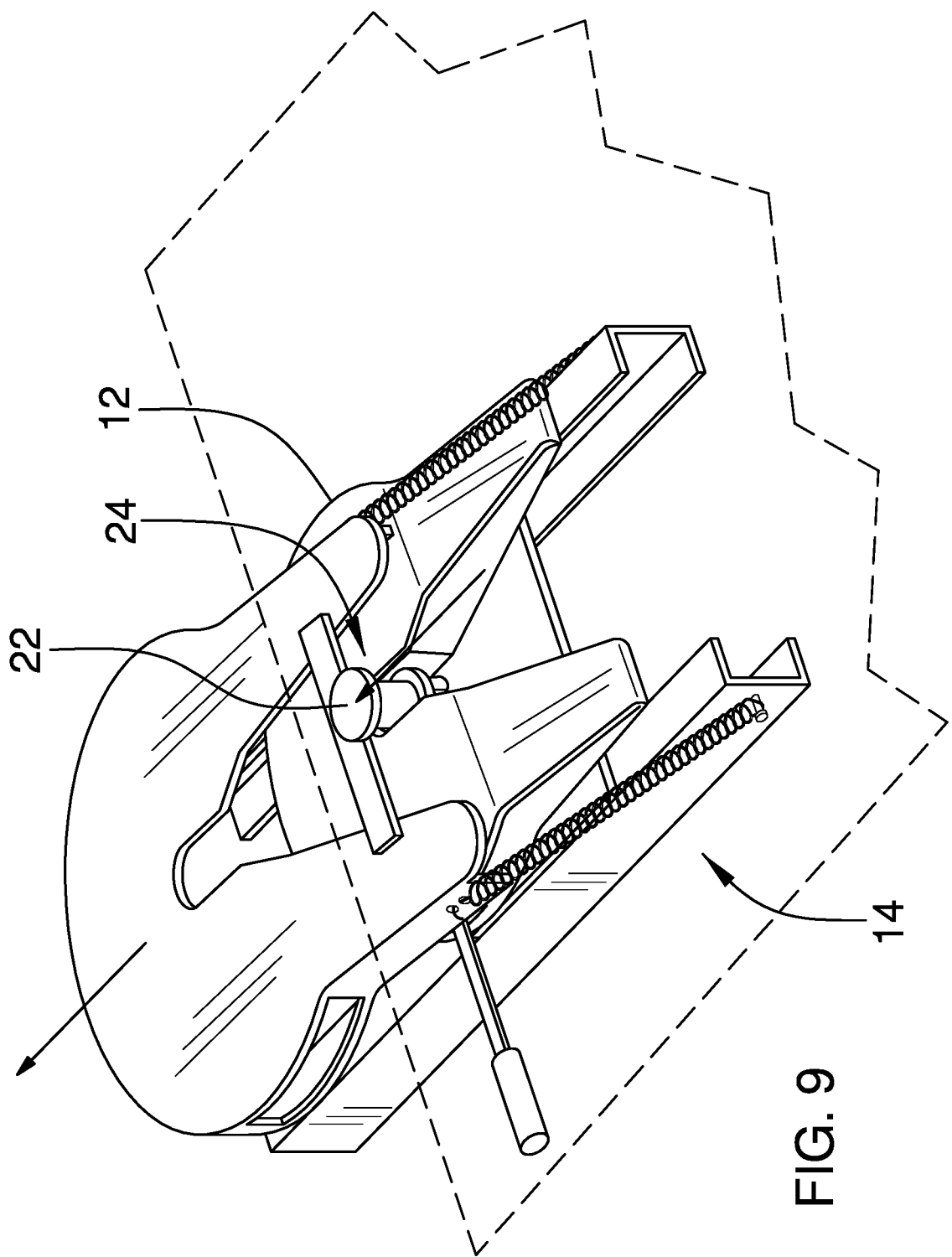
FIG. 9 is a top perspective view of an embodiment of the disclosure showing a cover being urged into an exposing position.

With reference now to the drawings, and in particular to FIGS. 1 through 9 thereof, a new fifth wheel device embodying the principles and concepts of an embodiment of the disclosure and generally designated by the reference numeral 10 will be described.

As best illustrated in FIGS. 1 through 9, the fifth wheel cover assembly 10 generally comprises a fifth wheel 12 that is mounted to a semi tractor 14. The fifth wheel 12 has a lobe 16, a pair of wings 18 each extending away from the lobe 16 and a pin slot 20 positioned between the wings 18 thereby facilitating the pin slot 20 to insertably receive a king pin 22 of a semi trailer 24. The fifth wheel 12 includes a latching mechanism 26 and the latching mechanism 26 includes a lever 28 extending laterally away from the fifth wheel 12 for manipulating the latching mechanism 26. The semi tractor 14 may be an over-the-road semi tractor of any conventional design and the fifth wheel 12 may be a semi tractor fifth wheel of any conventional design.

A cover 30 is slidably positioned over the fifth wheel 12 and the cover 30 is structured to conform to the shape of the fifth wheel 12. The cover 30 is comprised of a fluid impermeable material thereby inhibiting grease on the fifth wheel 12 from contaminating a roadway upon which the semi tractor 14 is driving. The cover 30 has a top wall 32 and the top wall 32 has top surface 34, a bottom surface 36 and a perimeter edge 38 extending between the top surface 34 and the bottom surface 36. The perimeter edge 38 has a front side 40, a first lateral side 42, a second lateral side 44, a first rear side 46, a second rear side 48, a first inner side 50 and a second inner side 52.

The front side 40 curves outwardly between the first lateral side 42 and the second lateral side 44 to define a lobe portion 54 of the cover 30 which conforms to the lobe 16 of the fifth wheel 12. Each of the first rear side 46 and the second rear side 48 is concavely arcuate with respect to the front side 40. Additionally, each of the first inner side 50 and the second inner side 52 angles toward the front side 40 and intersects each other at a center of the lobe portion 54 of the cover 30 to define a pair of wing portions 56 of the cover 30 which each conforms to wings 18 of the fifth wheel 12. Each of the first inner side 50 and the second inner side 52 has a primary section 58 and the primary section 58 of the first inner side 50 angles toward the primary section 58 of the second inner side 52 at a first angle.

Each of the first inner side 50 and the second inner side 52 has a secondary section 60 extending from the primary section 58 toward the front side 40. The secondary section 60 of the first inner side 50 angles toward the secondary section 60 of the second inner side 52 at a second angle that is greater than the first angle. Each of the first inner side 50 and the second inner side 52 has a tertiary section 62 extending from the secondary section 60 toward a pin curve 64 extending between the tertiary section 62 of the first inner side 50 and the tertiary section 62 of the second inner side 52. The tertiary section 62 of the first inner side 50 is oriented parallel with the tertiary section 62 of the second inner side 52 and the pin curve 64 curves toward the front side 40.

The cover 30 has a lip 66 extending downwardly from the bottom surface 36 of the top wall 32 and the lip 66 is aligned with the perimeter edge 38 of the top wall 32. The lip 66 extends around the front side 40 and along each of the first lateral side 42 and the second lateral side 44. Additionally, the lip 66 has a pair of terminal ends 68 that is each positioned adjacent to a respective one of the first rear side 46 and the second rear side 48. The lip 66 has a slot 70 extending through the lip 66 and the slot 70 begins at an intersection between the first lateral side 42 and the front side 40 of the perimeter edge 38 of the top wall 32. The slot 70 extends along a substantial length of the front side 40.

The bottom surface 36 of the top wall 32 rests on top of the fifth wheel 12 having the lobe portion 54 covering the lobe 16 of the fifth wheel 12 and having each of the wing portions 56 covering a respective wing 18 of the fifth wheel 12. Additionally, each of the first inner side 50 and the second inner side 52 of the perimeter edge 38 of the top wall 32 extends along the pin slot 20 in the fifth wheel 12. The lever 28 of the latching mechanism 26 extends outwardly through the slot 70 thereby facilitating the latching mechanism 26 to function normally.

A pair of springs 72 is each coupled between the cover 30 and a connection point 74 on the semi tractor 14. Each of the springs 72 biases the cover 30 into a covering position having the cover 30 completely covering the fifth wheel 12. The cover 30 is slidable into an exposing position having the cover 30 being displaced from the fifth wheel 12. Each of the springs 72 has a first end 76 and a second end 78, and the first end 76 of each of the springs 72 is coupled to a respective one of a plurality of connection points 80 on the lip 66 on the cover 30.

Each of the connection points 80 on the lip 66 is positioned adjacent to a respective one of the terminal ends 68 of the lip 66. Additionally, the second end 78 of each of the springs 72 is coupled to the connection point 74 on the semi tractor 14. Each of the connection points 80 on the lip 66 may comprise a hole extending through the lip 66, a pin attached to the lip 66 or other element to which the first end 76 of each spring 72 can be engaged. The lip 66 includes a grip 82 comprising a leg 84 extending downwardly from said lip 66 and a foot 86 extending away from said leg 84. The grip 82 is centrally positioned along the front side 40 of the perimeter edge 38 of the cover 30 such that the foot 86 is directed rearwardly on the cover 30. The grip 82 engages the fifth wheel 12 when the cover 30 is biased into the covering position.

A brace 88 is attached to the cover 30 and the brace 88 is strategically positioned such that the king pin 22 of the trailer abuts the brace 88 and urges the cover 30 into the exposing positioned when the semi trailer 24 is attached to the fifth wheel 12. The brace 88 has a primary end 90, a secondary end 92 and a lower surface 94 extending between the primary end 90 and the secondary end 92. Furthermore, the lower surface 94 of the brace 88 is attached to the top surface 34 of the top wall 32 of the cover 30 at a pair of connection points 96 each located adjacent to a respective one of the primary end 90 and the secondary end 92. The brace 88 extends between each of the wing portions 56 of the cover 30 and the brace 88 is positioned at a point that is spaced from the first rear side 46 and the second rear side 48 of the perimeter edge 38.

In use, the cover 30 is biased into the covering position when a semi trailer 24 is not attached to the fifth wheel 12. In this way lubricants, such as grease, that are applied to the fifth wheel 12 are inhibiting from dripping onto a roadway. Furthermore, the fifth wheel 12 is automatically covered when the semi trailer 24 is uncoupled from the fifth wheel 12. The king pin 22 on the semi trailer 24 abuts the brace 88 and urges the cover 30 into the exposing position when the semi trailer 24 is attached to the fifth wheel 12. Additionally, the slot 70 in the lip 66 is sufficiently elongated to inhibit the lever 28 from abutting against the lip 66 when the cover 30 is urged into the exposing position.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fifth wheel cover assembly for covering a fifth wheel on a semi tractor when the semi tractor is not towing a trailer, said assembly comprising:
    a fifth wheel being mounted to a semi tractor;
    a cover being slidably positioned over said fifth wheel, said cover being structured to conform to the shape of said fifth wheel, said cover being comprised of a fluid impermeable material thereby inhibiting grease on said fifth wheel from contaminating a roadway upon which the semi tractor is driving;
    a pair of springs, each of said springs being coupled between said cover and a connection point on the semi tractor, each of said springs biasing said cover into a covering position having said cover completely covering said fifth wheel, said cover being slidable into an exposing position having said cover being displaced from said fifth wheel; and
    a brace being attached to said cover, said brace being strategically positioned such that a king pin of the trailer abuts said brace and urges said cover into said exposing position when the semi trailer is attached to said fifth wheel.

2. The assembly according to claim 1, wherein:
    said fifth wheel has a lobe, a pair of wings each extending away from said lobe and a pin slot positioned between said wings thereby facilitating said pin slot to insertably receive a king pin of a semi trailer; and
    said cover has a top wall, said top wall having top surface, a bottom surface and a perimeter edge extending between said top surface and said bottom surface, said perimeter edge having a front side, a first lateral side, a second lateral side, a first rear side, a second rear side, a first inner side and a second inner side, said front side curving outwardly between said first lateral side and said second lateral side to define a lobe portion of said cover which conforms to said lobe of said fifth wheel, each of said first rear side and said second rear side being concavely arcuate with respect to said front side, each of said first inner side and said second inner side angling toward said front side and intersecting each other at a center of said lobe portion of said cover to define a pair of wing portions of said cover which each conforms to wings of said fifth wheel.

3. The assembly according to claim 2, wherein each of said first inner side and said second inner side has a primary section, said primary section of said first inner side angling toward said primary section of said second inner side at a first angle.

4. The assembly according to claim 3, wherein each of said first inner side and said second inner side has a secondary section extending from said primary section toward said front side, said secondary section of said first inner side angling toward said secondary section of said second inner side at a second angle being greater than said first angle.

5. The assembly according to claim 4, wherein each of said first inner side and said second inner side has a tertiary section extending from said secondary section toward a pin curve extending between said tertiary section of said first inner side and said tertiary section of said second inner side, said tertiary section of said first inner side being oriented parallel with said tertiary section of said second inner side, said pin curve curving toward said front side.

6. The assembly according to claim 2, wherein said cover has a lip extending downwardly from said bottom surface of said top wall, said lip being aligned with said perimeter edge of said top wall, said lip extending around said front side and along each of said first lateral side and said second lateral side, said lip having a pair of terminal ends each being positioned adjacent to a respective one of said first rear side and said second rear side.

7. The assembly according to claim 2, wherein said bottom surface of said top wall resting on top of said fifth wheel having said lobe portion covering said lobe of said fifth wheel and having each of said wing portions covering a respective wing of said fifth wheel and having each of said first inner side and said second inner side of said perimeter edge of said top wall extending along said pin slot in said fifth wheel.

8. The assembly according to claim 6, wherein:
    said fifth wheel includes a latching mechanism, said latching mechanism including a lever extending laterally away from said fifth wheel for manipulating said latching mechanism; and
    said lip has a slot extending through said lip, said slot beginning at an intersection between said first lateral side and said front side of said perimeter edge of said top wall, said slot extending along a substantial length of said front side, said lever of said latching mechanism extending outwardly through said slot.

9. The assembly according to claim 6, wherein each of said springs has a first end and a second end, said first end of each of said springs being coupled to a respective one of a plurality of connection points on said lip on said cover, each of said connection points being positioned adjacent to a respective one of said terminal ends of said lip, said second end of each of said springs being coupled to the connection point on the semi tractor.

10. The assembly according to claim 2, wherein:
    said brace has a primary end, a secondary end and a lower surface extending between said primary end and said secondary end, said lower surface of said brace being attached to said top surface of said top wall of said cover at a pair of connection points each being located adjacent to a respective one of said primary end and said secondary end;
    said brace extends between each of said wing portions of said cover; and
    said brace is positioned at a point being spaced from said first rear side and said second rear side of said perimeter edge.

11. A fifth wheel cover assembly for covering a fifth wheel on a semi tractor when the semi tractor is not towing a trailer, said assembly comprising:
    a fifth wheel being mounted to a semi tractor, said fifth wheel having a lobe, a pair of wings each extending away from said lobe and a pin slot positioned between said wings thereby facilitating said pin slot to insertably receive a king pin of a semi trailer, said fifth wheel including a latching mechanism, said latching mechanism including a lever extending laterally away from said fifth wheel for manipulating said latching mechanism;

a cover being slidably positioned over said fifth wheel, said cover being structured to conform to the shape of said fifth wheel, said cover being comprised of a fluid impermeable material thereby inhibiting grease on said fifth wheel from contaminating a roadway upon which the semi tractor is driving, said cover having a top wall, said top wall having top surface, a bottom surface and a perimeter edge extending between said top surface and said bottom surface, said perimeter edge having a front side, a first lateral side, a second lateral side, a first rear side, a second rear side, a first inner side and a second inner side, said front side curving outwardly between said first lateral side and said second lateral side to define a lobe portion of said cover which conforms to said lobe of said fifth wheel, each of said first rear side and said second rear side being concavely arcuate with respect to said front side, each of said first inner side and said second inner side angling toward said front side and intersecting each other at a center of said lobe portion of said cover to define a pair of wing portions of said cover which each conforms to wings of said fifth wheel, each of said first inner side and said second inner side having a primary section, said primary section of said first inner side angling toward said primary section of said second inner side at a first angle, each of said first inner side and said second inner side having a secondary section extending from said primary section toward said front side, said secondary section of said first inner side angling toward said secondary section of said second inner side at a second angle being greater than said first angle, each of said first inner side and said second inner side having a tertiary section extending from said secondary section toward a pin curve extending between said tertiary section of said first inner side and said tertiary section of said second inner side, said tertiary section of said first inner side being oriented parallel with said tertiary section of said second inner side, said pin curve curving toward said front side, said cover having a lip extending downwardly from said bottom surface of said top wall, said lip being aligned with said perimeter edge of said top wall, said lip extending around said front side and along each of said first lateral side and said second lateral side, said lip having a pair of terminal ends each being positioned adjacent to a respective one of said first rear side and said second rear side, said lip having a slot extending through said lip, said slot beginning at an intersection between said first lateral side and said front side of said perimeter edge of said top wall, said slot extending along a substantial length of said front side, said bottom surface of said top wall resting on top of said fifth wheel having said lobe portion covering said lobe of said fifth wheel and having each of said wing portions covering a respective wing of said fifth wheel and having each of said first inner side and said second inner side of said perimeter edge of said top wall extending along said pin slot in said fifth wheel, said lever of said latching mechanism extending outwardly through said slot;

a pair of springs, each of said springs being coupled between said cover and a connection point on the semi tractor, each of said springs biasing said cover into a covering position having said cover completely covering said fifth wheel, said cover being slidable into an exposing position having said cover being displaced from said fifth wheel, each of said springs having a first end and a second end, said first end of each of said springs being coupled to a respective one of a plurality of connection points on said lip on said cover, each of said connection points being positioned adjacent to a respective one of said terminal ends of said lip, said second end of each of said springs being coupled to the connection point on the semi tractor; and a brace being attached to said cover, said brace being strategically positioned such that the king pin of the trailer abuts said brace and urges said cover into said exposing position when the semi trailer is attached to said fifth wheel, said brace having a primary end, a secondary end and a lower surface extending between said primary end and said secondary end, said lower surface of said brace being attached to said top surface of said top wall of said cover at a pair of connection points each being located adjacent to a respective one of said primary end and said secondary end, said brace extending between each of said wing portions of said cover, said brace being positioned at a point being spaced from said first rear side and said second rear side of said perimeter edge.

* * * * *